(12) United States Patent
Lupescu et al.

(10) Patent No.: US 8,926,910 B2
(45) Date of Patent: Jan. 6, 2015

(54) HYDROCARBON TRAP FOR REDUCING COLD-START ENGINE EMISSIONS

(75) Inventors: Jason Aaron Lupescu, Ypsilanti, MI (US); Hungwen Jen, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 283 days.

(21) Appl. No.: 13/367,673

(22) Filed: Feb. 7, 2012

(65) Prior Publication Data

US 2013/0202495 A1 Aug. 8, 2013

(51) Int. Cl.
*B01D 50/00* (2006.01)
(52) U.S. Cl.
USPC .......................................................... 422/177
(58) Field of Classification Search
CPC ....... F01N 3/08; F01N 3/0807; F01N 3/0835; F01N 3/0814; B01D 53/02
USPC .......................................... 422/168, 177, 180
See application file for complete search history.

(56) References Cited

U.S. PATENT DOCUMENTS

| | | | |
|---|---|---|---|
| 5,492,679 | A | 2/1996 | Ament et al. |
| 6,171,556 | B1 | 1/2001 | Burk et al. |
| 6,617,276 | B1 | 9/2003 | Ballinger et al. |
| 6,790,808 | B2 | 9/2004 | Tanada et al. |
| 6,887,444 | B1 | 5/2005 | Yamamoto |
| 2002/0022573 | A1 * | 2/2002 | Tanada et al. ................. 502/344 |
| 2008/0034740 | A1 * | 2/2008 | Strehlau et al. ................. 60/299 |
| 2009/0082194 | A1 * | 3/2009 | Tissler et al. .................... 502/74 |
| 2011/0207909 | A1 * | 8/2011 | Jeong et al. .................... 528/405 |
| 2011/0305612 | A1 * | 12/2011 | Muller-Stach et al. ........ 423/212 |

FOREIGN PATENT DOCUMENTS

JP 20050081250 3/2005

OTHER PUBLICATIONS

Heimrich et al., "Cold-Start Hydrocarbon Collection for Advanced Exhaust Emission Control", SAE International, SAE Technical Paper 920847, 1992, do 10.4271/920847.
Li et al., "Application of zeolites as hydrocarbon traps in automotive emission controls", Sincerest Studies in Surface Science and Catalysis, vol. 158, Part 2, 2005, pops 1375-1382.
Yeon et al., "Adsorption and desorption characteristics of hydrocarbons in multi-layered hydrocarbon traps", ScienceDirect, Microporous and Mesoporous Materials, vol. 119, Issues 1-3, Mar. 1, 2009, pp. 349-355.

* cited by examiner

*Primary Examiner* — Tom Duong
(74) *Attorney, Agent, or Firm* — Damian Porcari; Dinsmore & Shohl LLP

(57) ABSTRACT

A hydrocarbon trap is provided for reducing cold-start hydrocarbon emissions. The trap contains an acidic absorption material for improving absorption of low molecular weight hydrocarbons. The acidic absorption materials may be used either alone or in combination with zeolites which are integrated into and/or supported on a monolithic substrate. The hydrocarbon trap may be positioned in the exhaust gas passage of a vehicle such that hydrocarbons are adsorbed on the trap and stored until the engine and exhaust reach a sufficient temperature for desorption.

15 Claims, 4 Drawing Sheets

HYDROCARBON TRAP FOR REDUCING COLD-START ENGINE EMISSIONS

BACKGROUND OF THE INVENTION

Embodiments described herein relate to a hydrocarbon trap having improved absorption of cold-start engine emissions, and more particularly, to a hydrocarbon trap containing an acidic absorption material for improving absorption of low molecular weight hydrocarbons.

In recent years, considerable efforts have been made to reduce the level of hydrocarbon emissions from vehicle engines. For example, government regulations in the United States have restricted emissions of non-methane organic gas (NMOG) during cold-start of engines. Cold start engine emissions are recognized as a significant contributor to hydrocarbon exhaust emissions as most catalysts used in vehicle exhausts rely on the latent heat of the exhaust gas to become catalytically active. It has been estimated that 70 to 80% of the non-methane hydrocarbon emissions that escape conversion by the catalysts are emitted during the first two minutes after a cold start as a vehicle typically requires up to two minutes to supply sufficient heat for the catalyst to reach a light-off temperature, i.e., about 200° C. to 400° C. Ethylene and propylene comprise a large portion of NMOG in vehicle exhausts. Since these molecules have low boiling points and high vapor pressures, they tend to exit from the exhaust at the low temperatures experienced during cold start.

Hydrocarbon traps have been developed for reducing emissions during cold-start by trapping hydrocarbon (HC) emissions at low temperatures and releasing them at sufficiently elevated temperatures through a catalyzed overlayer or by passing the emissions to downstream catalysts for complete oxidation. Currently, zeolites or molecular sieves have been the most widely used absorption materials for hydrocarbon traps. However, low molecular weight molecules of hydrocarbons, such as ethylene, propylene, and ethanol, tend to be released from zeolites at temperatures below those required for oxidation by catalysts. In addition, the pore structure of zeolites tends to limit the size of hydrocarbon species that can be adsorbed.

Further, hydrocarbon traps utilizing zeolites tend to suffer from decreased thermal durability upon aging when used in an exhaust system. This is due, at least in part, to alumina in the zeolite being leached out of the zeolite in the presence of water vapor at high temperatures. This results in less absorptive capacity for low molecular weight hydrocarbons. For example, in traps which utilize a bottom zeolite layer and a top catalyst layer, the aging process presents several problems. The top catalyst requires a higher temperature for conversion of stored hydrocarbon emissions and, as the bottom zeolite layer becomes dealuminated, it releases stored hydrocarbon emissions at lower temperatures. Generally, as the $SiO_2/Al_2O_3$ ratio of zeolite decreases, the thermal durability of the zeolite decreases. Likewise, zeolites with high $SiO_2/Al_2O_3$ ratios typically have decreased absorptive capacity. In fact, by the time the vehicle reaches 150,000 miles, few hydrocarbons stored in the zeolite are retained until the required temperature is reached for catalytic conversion.

While metal ions such as Cu, Fe, or Ag may be added to the zeolite in hydrocarbon traps to enhance hydrocarbon absorption, such metal ions can have a negative effect on the storage and thermal durability of the trap.

Accordingly, there is a need in the art for a hydrocarbon trap which can improve the efficiency of reduction of cold-start engine emissions including NMOG and particularly, low molecular weight hydrocarbons. There is also a need for a hydrocarbon trap which is thermally durable and long-lived.

SUMMARY OF THE INVENTION

Embodiments of the invention meet those needs by providing a hydrocarbon trap which includes acidic absorption materials containing many Bronsted acid sites to improve the absorption of small hydrocarbons. Such materials may be used either alone, or in combination with zeolites having a high $SiO_2/Al_2O_3$ ratio to enhance the thermal durability of the acid sites against hydrothermal conditions.

By "enhanced thermal durability," it is meant that the hydrocarbon trap converts stored hydrocarbon emissions at a steady temperature (i.e., it does not require higher conversion temperatures over time) and/or does not release the stored hydrocarbon emissions at lower temperatures over time.

According to one aspect of the invention, a hydrocarbon trap for reducing cold-start vehicle exhaust emissions is provided which comprises a monolithic substrate and an acidic absorption material which is provided in and/or on the substrate. The acidic absorption material is selected from the group consisting of acidic oxides comprising alumina and silica-alumina; superacids comprising sulfated zirconia; a heteropolyacid, or a silica-supported heteropolyacid comprising $M_xH_{3-x}PW_{12}O_{40}$ and $M_xH_{3-x}PMo_{12}O_4$, where x is from 0 to 2.5; or mixtures thereof. The monolithic substrate is preferably selected from the group consisting of zirconium oxide, cordierite, silicon carbide, or silica gel.

In one embodiment, the hydrocarbon trap further comprises an absorption material comprising zeolite. The zeolite has a $SiO_2/Al_2O_3$ ratio of about 50 to 500, and preferably, greater than 100.

In one embodiment, the acidic absorption material and zeolite form a mixture on the monolithic support. In another embodiment, the acidic absorption material resides in the pores of the zeolite. In this embodiment, the acidic absorption material has a volume between about 0.01 and 0.15 $cm^3$/g-zeolite and comprises between about 1 and 90 wt % of the total absorption materials.

In one embodiment, the hydrocarbon trap comprises a layer of zeolite on the monolithic substrate and a layer of acidic absorption material on the zeolite. In an alternative embodiment, the trap includes a layer of acidic absorption material on the monolithic substrate and a layer of zeolite on the acidic absorption material.

According to another aspect of the invention, an exhaust treatment system is provided which comprises a hydrocarbon trap positioned in the exhaust passage of a vehicle for reducing emissions of hydrocarbons. The trap comprises a monolithic substrate and an acidic absorption material provided in and/or on the substrate selected from the group consisting of acidic oxides comprising alumina and silica-alumina; superacids comprising sulfated zirconia; a heteropolyacid or a silica-supported heteropolyacid comprising $M_xH_{3-x}PW_{12}O_{40}$ and $M_xH_{3-x}PMo_{12}O_4$, where x is from 0 to 2.5; or mixtures thereof. The hydrocarbon trap preferably further includes an absorption material comprising zeolite.

As exhaust gases are passed through the exhaust passage, the hydrocarbon trap provides improved absorption of small hydrocarbons and retains the small hydrocarbons until sufficient temperatures are reached for catalytic conversion, i.e., about 200° C. to 400° C., at which time the hydrocarbons are desorbed and may be passed over downstream catalysts for complete oxidation.

Accordingly, it is a feature of the present invention to provide a hydrocarbon trap for reducing cold start vehicle exhaust emissions. Other features and advantages of the invention will be apparent from the following description, the accompanying drawings, and the appended claims.

DETAILED DESCRIPTION OF THE PREFERRED EMBODIMENTS

Figure 1:
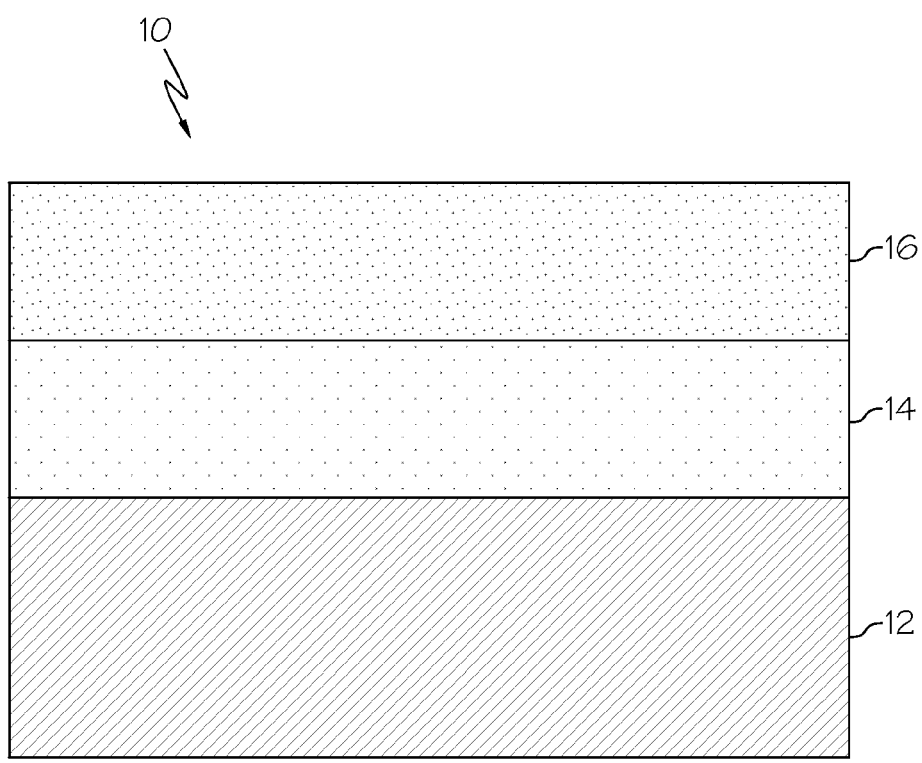
FIG. 1 is a schematic illustration of a hydrocarbon trap in accordance with an embodiment of the invention.

Embodiments of the hydrocarbon trap described herein utilize acidic absorption materials containing multiple Bronsted acid sites, which improves the absorption of small hydrocarbons and also enhances the thermal durability of the trap.

Bronsted acids are compounds that dissociate in solution and release hydrogen ions (i.e., are proton donors). We have found that the problem of desorption of hydrocarbons at low temperatures can be avoided by increasing the number of Bronsted acid sites in the trap with the use of acidic absorption materials. For example, the interaction of propylene and ethylene olefins with a Bronsted acid active site results in the formation of a carbonium ion that is positively charged and is strongly bonded to the negatively charged oxygen ion from the acid. The acid also catalyzes the polymerization of olefins such as ethylene and propylene, forming a hydrocarbon species having a high boiling point.

For vehicles running on ethanol-containing fuels, the trap can reduce the emission of ethanol during cold-start. For example, the existence of a Bronsted acid active site in the trap catalyzes the dehydration of ethanol to form a carbonium ion that is held in the trap and can be desorbed at high temperatures as ethanol or as a dehydrated product, i.e., ethylene.

Embodiments of the hydrocarbon trap described herein also provide an advantage over prior traps in that the trap does not utilize any added metal ions such as Cu, Fe, or Ag as such ions tend to replace the Bronsted acid site and disable the carbonium ion intermediate mechanism.

Unless otherwise indicated, the disclosure of any ranges in the specification and claims are to be understood as including the range itself and also anything subsumed therein, as well as endpoints.

Preferred acidic absorption materials for use in the trap include acidic oxides such as alumina and silica-alumina, superacids such as sulfated zirconia, Keggin-type heteropolyacids such as $M_xH_{3-x}PW_{12}O_{40}$ and $M_xH_{3-x}PMo_{12}O_4$, and supported heteropolyacids such as silica-supported $M_xH_{3-x}PW_{12}O_{40}$, where x is from 0 to 2.5.

These acidic absorption materials can be used in hydrocarbon traps as the main absorption materials for small hydrocarbons. By small hydrocarbons, it is meant hydrocarbon species having from about 2 to 3 carbons. Alternatively, the acidic absorption materials may be mixed with other absorptive materials such as zeolite, or they may be provided in the form of nanoparticles which are formed in-situ within the structures of other absorbent materials such as zeolite.

Where the acidic absorption material forms the entire absorption phase, the material preferably comprises silica-alumina or a silica-supported heteropolyacid.

Where the acidic absorption material is used in combination with other absorptive materials such as zeolite, the acidic absorption material may be applied as an individual layer which is separate from the rest of the trap. For example, a layer of silica-alumina or supported heteropolyacid may be coated on the first or second major surface of a zeolite. Alternatively, the acidic absorption material(s) may be mixed as powders with the other components of the trap. For example, a mixture of silica-alumina or superacid powders and zeolite powders can be washcoated on a monolith substrate. In a preferred embodiment, a layer of zeolite-superacid mixture is washcoated on a monolith wall. The zeolite-superacid mixture may be formed into a slurry and the pH adjusted until the slurry adheres to the monolith wall. The coating is then dried and hardened. Alternatively, the zeolite-superacid mixture can be integrated into a ceramic monolith by combining the mixture with a ceramic binder or similar material and extruding through a die into a monolith followed by drying and hardening.

With the addition of an acidic absorption material containing multiple Bronsted acid sites, the number of acid sites in the trap is raised and allows the simultaneous use of a zeolite with a high $SiO_2/Al_2O_3$ ratio without sacrificing the absorptive capacity of the trap. The amount of acidic absorption materials with Bronsted acid sites can range between about 1 wt % and 90 wt % of the total absorption materials.

In embodiments where the acidic absorption material is created in-situ inside the zeolite structure, sulfated zirconia is prepared by precipitation of nanosize zirconia particles inside the zeolite pores, followed by in-situ sulfation. The sulfated zirconia-containing zeolite can then be coated on a monolith wall. In this embodiment, the acidic absorption material created inside the pore of zeolite should preferably have a volume between about 0.01 and 0.15 $cm^3$/g-zeolite. The resulting trap provides a strong trapping action due to the capillary effect of the zeolite pore for the intermediates adsorbed on the acid sites.

It should be appreciated that the Bronsted acid sites (Al—O—H+) typically contained in a zeolite (i.e., with a $SiO_2/Al_2O_3$ ratio of less than 50) are integrated into the crystal framework of the zeolite. High temperature steam removes these sites over time by causing the alumina to break bonds with the connecting oxygen molecules. A high silica zeolite (i.e., with a $SiO_2/Al_2O_3$ ratio of >100) is more resistant to the effects of alumina removal, but is relatively inert for small hydrocarbon capture due to sparse Bronsted acid sites. Thus, the addition of Bronsted acid sites which are not connected to the framework structure provide more function to the trapping mechanism for the highly stable high silica zeolite structure.

Referring now to FIG. 1, embodiments of the hydrocarbon trap 10 are illustrated. As shown in FIG. 1, the trap 10 includes a monolith substrate 12, a layer of acidic absorption material 14 on the monolith substrate, and a separate layer of beta-zeolite material 16 on the acidic absorption material.

Figure 2:
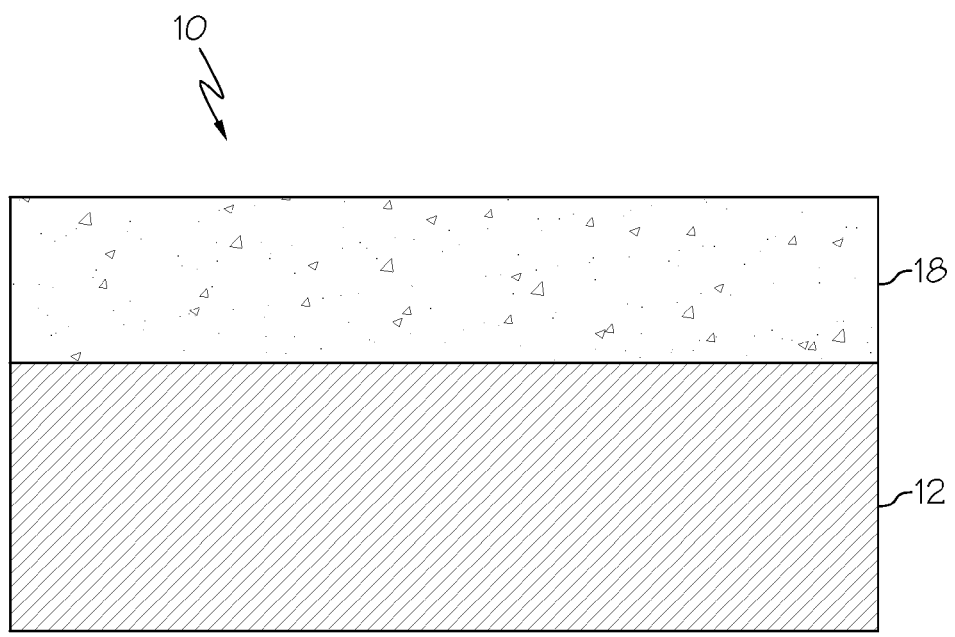
FIG. 2 is a schematic illustration of a hydrocarbon trap in accordance with another embodiment of the invention.

FIG. 2 illustrates an alternative embodiment in which the trap includes an absorption layer 18 comprising a mixture of an acidic absorption material such as sulfated zirconia and beta-zeolite. The mixture is preferably washcoated onto the monolith substrate wall 12.

Figure 3A:
FIG. 3A is a schematic illustration of a hydrocarbon trap in accordance with another embodiment of the invention.
Figure 3B:
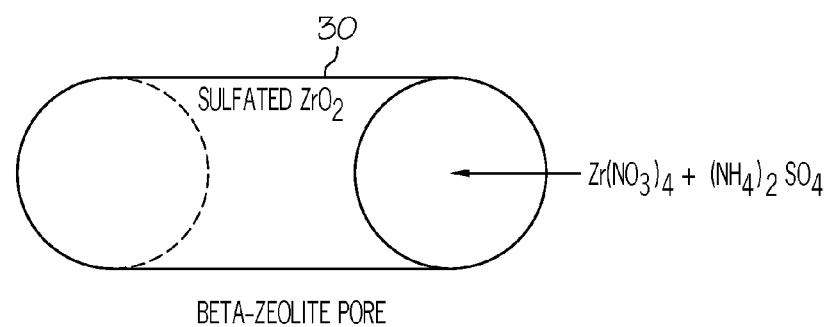
FIG. 3B is an enlarged view of a zeolite pore shown in the trap of FIG. 3A.

FIGS. 3A and 3B illustrate another embodiment in which the acidic absorption material has been created inside the zeolite pores 30 and applied as a washcoated absorption layer 20 on the monolith substrate wall 12.

Figure 4:
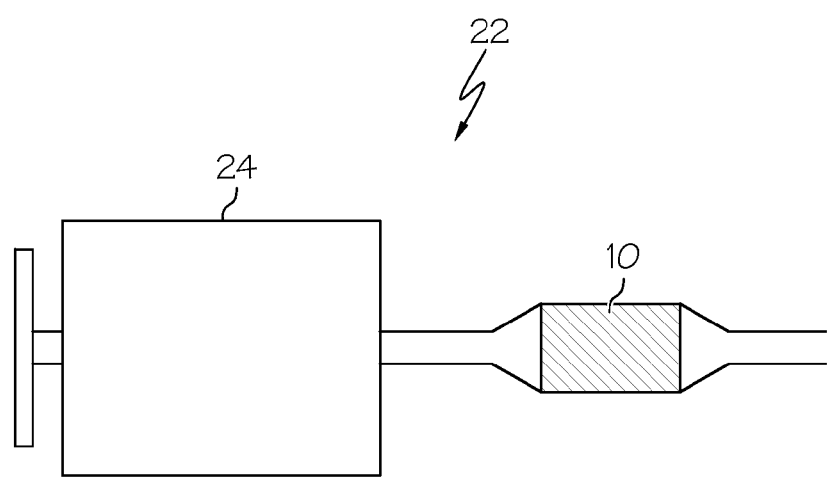
FIG. 4 is a schematic illustration of an exhaust treatment system including a hydrocarbon trap in accordance with an embodiment of the invention.

Referring now to FIG. 4, an exhaust treatment system 22 including the hydrocarbon trap 10 is shown. As shown, the exhaust treatment system is coupled to an exhaust manifold 24 of an engine. The system may include additional catalysts or filters (not shown) in addition to the hydrocarbon trap.

During operation, as exhaust gas generated by the engine passes through the hydrocarbon trap 10, the emissions of ethanol and other small molecules of hydrocarbons such as propylene and ethylene are adsorbed and stored in the trap. The hydrocarbons will not be released until the engine and the exhaust therefrom reach sufficiently elevated temperatures to cause desorption. The desorbed molecules may be passed over downstream catalysts for complete oxidation/conversion to $CO_2$ and $H_2O$.

The hydrocarbon trap may be used in flexible fuel vehicles, vehicles with turbochargers, or any vehicles which are subject to high cold-start hydrocarbon emissions.

Having described the invention in detail and by reference to preferred embodiments thereof, it will be apparent that modifications and variations are possible without departing from the scope of the invention.

What is claimed is:

1. A hydrocarbon trap for reducing cold-start vehicle exhaust emissions consisting essentially of:
   a monolithic substrate; and
   an acidic absorption material provided in and/or on said substrate selected from the group consisting of acidic oxides comprising alumina and silica-alumina; superacids comprising sulfated zirconia; a heteropolyacid or a silica-supported heteropolyacid comprising $M_xH_{3-x}PW_{12}O_{40}$ and $M_xH_{3-x}PMo_{12}O_4$, where x is from 0 to 2.5, or mixtures thereof; wherein said acidic absorption material contains multiple Bronsted acid sites for the absorption of small hydrocarbons.

2. The hydrocarbon trap of claim 1 further comprising a zeolite absorption material.

3. The hydrocarbon trap of claim 2, wherein said acidic absorption material and zeolite form a mixture on said monolithic substrate.

4. The hydrocarbon trap of claim 2 wherein said zeolite absorption material includes pores therein and said acidic absorption material is contained in said pores.

5. The hydrocarbon trap of claim 4 wherein said acidic absorption material has a volume between about 0.01 and 0.15 $cm^3$/g-zeolite.

6. The hydrocarbon trap of claim 2 comprising a layer of zeolite on said monolithic substrate and a layer of said acidic absorption material on said zeolite.

7. The hydrocarbon trap of claim 2 comprising a layer of acidic absorption material on said monolithic substrate and a layer of zeolite on said acidic absorption material.

8. The hydrocarbon trap of claim 2 wherein said acidic absorption material comprises between about 1 and 90 wt % of the total absorption materials.

9. The hydrocarbon trap of claim 2 wherein said zeolite has a $SiO_2/Al_2O_3$ ratio greater than 100.

10. The hydrocarbon trap of claim 1 wherein said acidic absorption material comprises silica-alumina.

11. The hydrocarbon trap of claim 1 wherein said acidic absorption material comprises a silica-supported heteropolyacid.

12. The hydrocarbon trap of claim 1 wherein said acidic absorption material comprises sulfated zirconia.

13. The hydrocarbon trap of claim 1 wherein said monolithic substrate is selected from the group consisting of zirconium oxide, cordierite, silicon carbide, or silica gel.

14. An exhaust treatment system consisting essentially of:
   a hydrocarbon trap positioned in an exhaust passage of a vehicle for reducing emissions of hydrocarbons, said trap comprising a monolithic substrate and an acidic absorption material provided in or on said substrate selected from the group consisting of acidic oxides comprising alumina and silica-alumina; superacids comprising sulfated zirconia; a heteropolyacid or a silica-supported heteropolyacid comprising $M_xH_{3-x}PW_{12}O_{40}$ and $M_xH_{3-x}PMo_{12}O_4$, where x is from 0 to 2.5, or mixtures thereof; wherein said acidic absorption material contains multiple Bronsted acid sites for the absorption of small hydrocarbons.

15. The exhaust treatment system of claim 14 wherein said hydrocarbon trap further includes a zeolite absorption material.

* * * * *